United States Patent [19]

Kanazawa

[11] 4,227,221

[45] Oct. 7, 1980

[54] PCM RECORDING APPARATUS

[75] Inventor: Yasunori Kanazawa, Hachioji, Japan

[73] Assignee: Hitachi, Ltd., Japan

[21] Appl. No.: 962,769

[22] Filed: Nov. 21, 1978

[30] Foreign Application Priority Data

Nov. 21, 1977 [JP] Japan .................................. 52-138974

[51] Int. Cl.² ........................... G11B 5/00; G11B 5/02
[52] U.S. Cl. ........................................ 360/32; 360/18; 360/24
[58] Field of Search ..................... 360/32, 47, 18, 22, 360/24, 53, 38, 146.1 BE, 146.1 F, 146.1 AB

[56] References Cited

U.S. PATENT DOCUMENTS

| | | | |
|---|---|---|---|
| 3,979,721 | 9/1976 | Umemoto et al. | 360/32 |
| 4,076,969 | 2/1978 | Sacks | 360/38 |
| 4,138,694 | 2/1979 | Doi | 360/32 |
| 4,155,041 | 5/1979 | Burns et al. | 360/38 |

*Primary Examiner*—Vincent P. Canney
*Attorney, Agent, or Firm*—Craig & Antonelli

[57] ABSTRACT

A PCM recording apparatus is disclosed in which digitized left and right channel sample signals each having error detecting bits and a signal indicative of a correlation such as sum or difference of the two samples are recorded on a record medium in a predetermined arrangement, and an error in coding is detected from the correlation signal.

4 Claims, 5 Drawing Figures

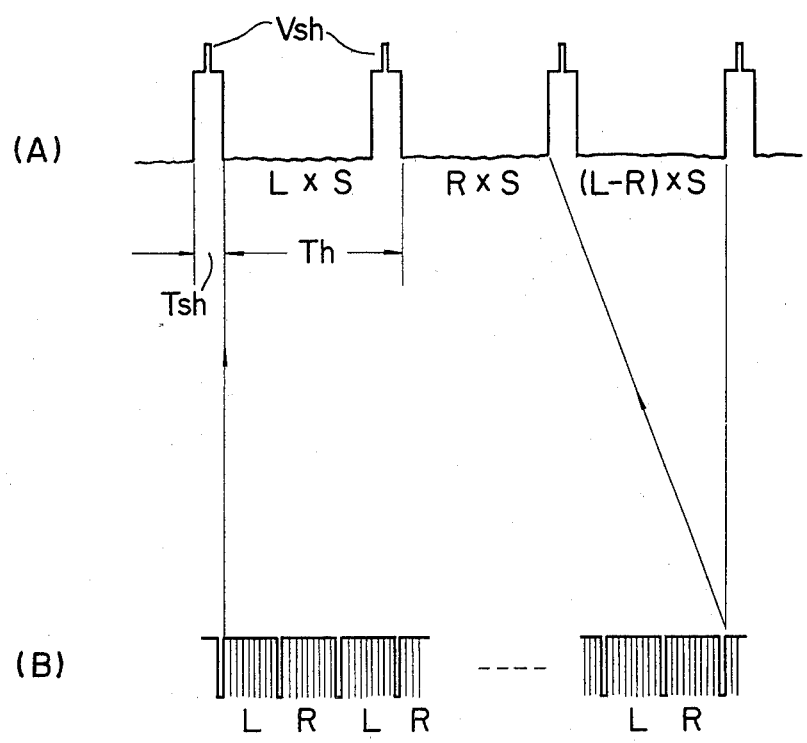
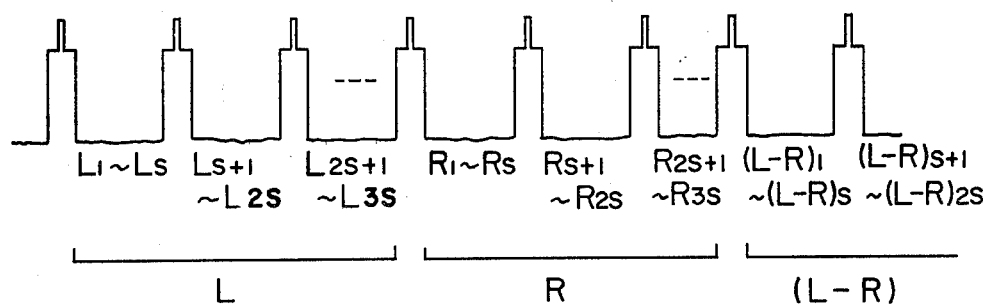

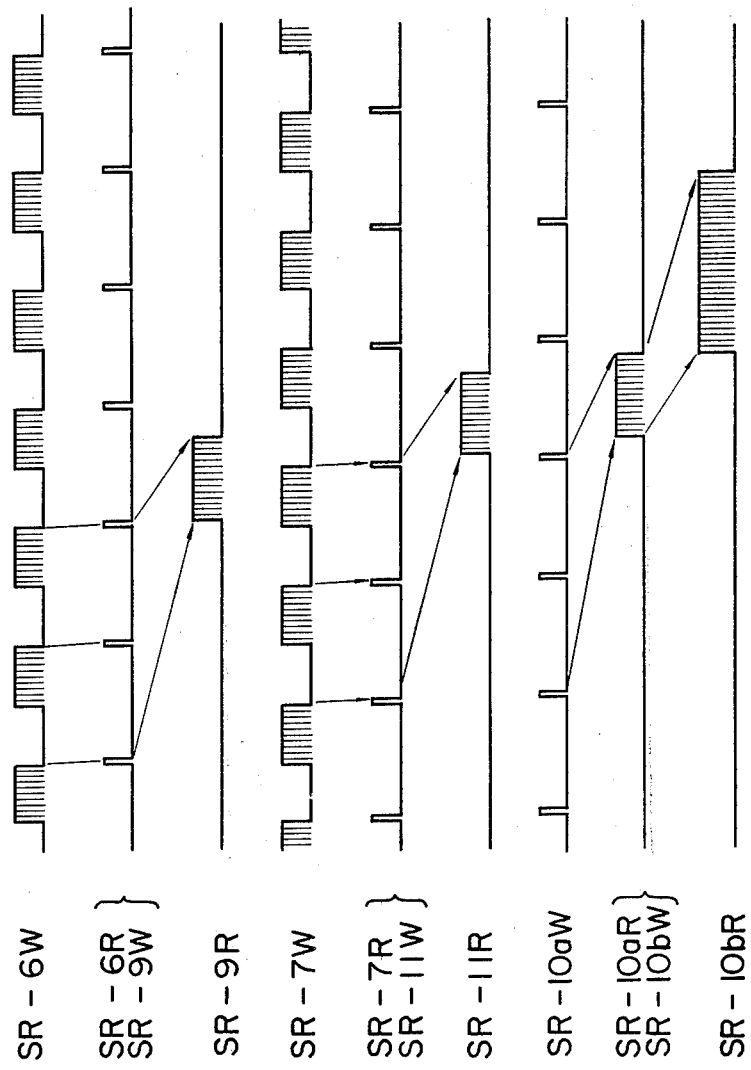

PCM RECORDING APPARATUS

The present invention relates to a high fidelity recording apparatus which encodes an analog information sound signal to digitally record it.

In a digital recorder, an input analog sound signal is sampled at a frequency which is more than twice as high as a frequency band of the sound signal and encodes the sampled signals to a binary code. Accordingly, a record frequency band of up to several times as wide as the sound frequency band is usually required. Heretofore, therefore, a VTR or a multi-track system which utilizes a singal distribution to a number of tracks and records them thereon, has been utilized.

On the other hand, in the digital recorder, the loss of information due to the dropout in a tape-head system and the coding error due to the noise in a record-playback system have great influence on the recorder, and a large pulsive noise (so-called clicking noise) is apt to occur. Heretofore, approaches to overcome this noise problem have become important. As one approach, a parity check has been commonly known but it does not provide sufficient error detection capacity. Therefore, various alternative approaches such as multi-recording system in which the same information is recorded on different tracks on the record medium or an error detecting system using a coding theory such as cyclic coding have been discussed. In the multi-recording system, however, in order to provide the error detection and correction capability for the loss of information, it is necessary to record the original information in duplication and further record error detecting bits. As a result, at least twice as much as information must be recorded.

When the coding theory is applied, the improvement of precision of error detection may be expected if an error pattern is predictable, but an error detection and correction capability which is sufficient for a high fidelity recorder cannot be generally expected unless the redundancy is greatly increased. By this is meant that there is not much difference from the multi-recording system with respect to the amount of information to be recorded. Thus, in the prior art methods, at least twice as much as reduddancy must be provided, and hence the recording density increases at least twice. As a result, the probability of dropout increases and a C/N ratio in the record-playback system decreases. This leads to the increase of coding error and requires a record-playback system having a very wide record frequency band.

As a method for compensating for coding error, it has been commonly practiced to reset information in the error region to "O" and retain the immediately preceding correct information in place of the error information. Although it has been recognized that this technique may be acceptable in audible sense for a burst error of a very small number of samples, it has been known that this technique cannot provide the compensation capability for the dropout over a number of samples. The multi-recording system may be used to compensate for such error but it has a limitation on the record band width and the number of times of multiplication and hence it is not an effective method.

It is an object of the present invention to overcome the drawbacks encountered in the prior art apparatus and provide a PCM recording apparatus which has a sufficient coding error detection and correction capability for use in high fidelity recording and reproduction while suppressing the increase of redundancy in the information to be recorded.

According to the present invention, a sum of difference signal of two stereo-channels and a signal indicative of correlation between the two channels are utilized as coding error detecting and correcting signals. The two channel signals, that is, left and right channel signals and the correlation signal are recorded on discrete regions on the record medium so that the influence by a burst error which often occurs in the magnetic recording is minimized.

According to another aspect of the present invention, instead of the correlation signal such as the sum or difference signal of the left and right channels, a correlation signal of a current sample and an immediately preceding sample in each of the channels and the correlation signal of the respective channels are recorded to improve the coding error detection and correction capability.

The above and other objects, features and advantages of the present invention will be apparent from the following detailed description of the preferred embodiments of the invention when taken in conjunction with the accompanying drawings, in which:

FIG. 1 shows video signal waveforms for illustrating a basic configuration of the present invention, in which (A) shows a video signal waveform in accordance with the present invention and (B) shows an original information waveform;

FIG. 3 shows a timing diagram for explaining a basic principle of the operation of FIG. 2;

FIG. 4 shows a video signal pattern for illustrating another embodiment of the present invention.

FIG. 1 shows a video signal waveform when the present invention is applied to a video tape recorder which is used as a recorder-playback system. In FIG. 1, $V_{sh}$ denotes a horizontal synchronizing signal. In respective horizontal scan periods, S number of L-channel information, S number of R-channel information and S number of sum signals (L+R) or difference signals (L−R) are sequentially recorded. Thus, total of three horizontal scan periods are used as a record unit.

Thus, an original input signal shown in (B) in FIG. 1 is recorded in a compressed form on a time axis. In case of FIG. 1, a compression ratio is determined by the fact that 2B number of data (for both L and R-channels) of the original information included in the three horizontal scan periods are compressed in two horizontal periods.

The video signal includes horizontal retrace periods and vertical retrace periods. Since no signal is recorded in those periods, the remaining period of time corresponds to an effective record period in each frame. According to the specification for the video signal, the length of the effective record period is equal to 71.2% of one frame period. Thus, a clock cycle period on the record tape is compressed by the factor of 0.712 with respect to the clock cycle period of the original data. It corresponds to the factor of 1.4 in frequency. Accordingly, it is necessary to select the frequency to assure a sufficient C/N ratio for the tape-head system. For example, for the requirement of high fidelity recording, if a sampling frequency is 50 KHz, the number of quantization bits is 12 and the number of error detecting bits to be added to each sample is 2, one sample consists of 14 bits and the clock frequency for the two-channel stereo-system is 1.4 MHz and hence the clock frequency after time compression is 1.96 MHz. This value will be sufficient for digital recording because a conventional home video tape recorder attains an S/N ratio of almost 40 dB.

Thus, by separately recording the L and R-channels and also separately recording the sum or difference signal of the L and R-channels at discrete regions on the magnetic tape, the influence by the dropout of the magnetic tape can be reduced. For example, even if the entire horizontal period (1H) of information is lost by the dropout, the lost information in that period can be exactly recovered if the other channel information and the sum or difference signal are correctly received.

Figure 2:
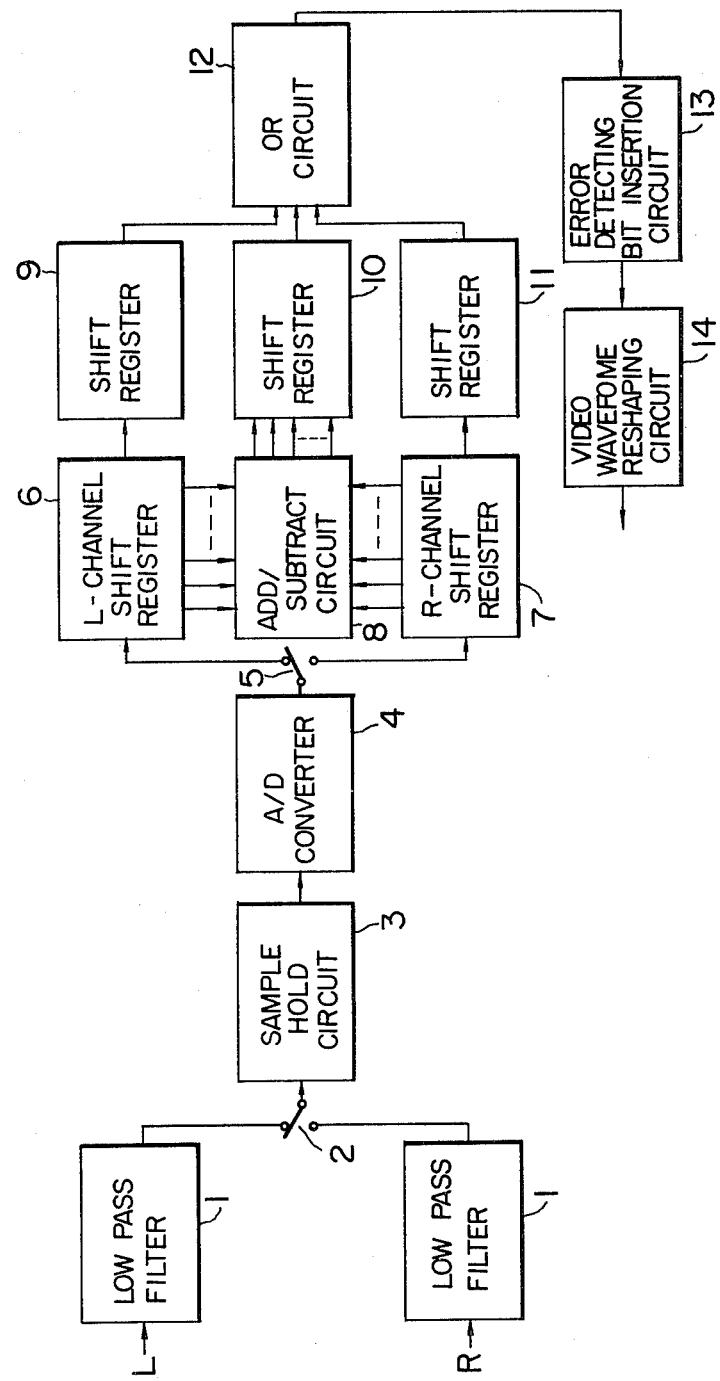
FIG. 2 is a block diagram of one embodiment of the present invention.

FIG. 2 shows a configuration for carrying out recording in accordance with the present invention. Left (L) and right (R)-channel signals are applied to low-pass filters 1, thence to a switch 2 and a sample hold circuit 3 in which the signals are time-division-multiplexed producing a PAM signal.

The PAM signal is then encoded by an A/D converter 4 and split to L and R-channel signals by a switch 5, thence they are supplied to an L-channel shift register 6 and an R-channel shift register 7, respectively. The shift registers 6 and 7 each has a number of bit positions corresponding to one sample and parallel outputs thereof which are applied to an add/subtract circuit 8, which in turn produces a sum or difference signal. The outputs of the shift registers 6 and 7 are applied to shift registers 9 and 11, respectively, each having a number of bit positions corresponding to the number of samples included in one horizontal period (1H), and the output of the add/subtract circuit 8 is applied to a difference signal shift register 10. The outputs of the shift registers 9, 10 and 11 are read at a timing which assures the record pattern sequence shown in FIG. 1 and then applied to an OR circuit 12, thence to an error detecting bit insertion circuit 13. The output of the circuit 13 is applied to a video waveform reshaping circuit 14 where it is converted to a video signal, which is supplied as a record signal to the video tape recorder.

Now considering the timing relationship of the shift registers 6 to 11, since one horizontal scan period $T_h$ in FIG. 1 is equal to 63.5 $\mu$s and the horizontal synchronizing pulse width $T_{sh}$ is equal to 10.16 $\mu$s, the time period actually available for recording in one horizontal scan period is equal to 53.34 $\mu$s.

On the other hand, as described above, one sample period for the high fidelity recording is equal to 7.143 $\mu$s because the clock frequency during recording is about 1.90 MHz.

Accordingly, approximately eight samples can be recorded in one horizontal scan period. For the sake of convenience of explanation, a simplified timing relationship is shown in FIG. 3.

In FIG. 3, write clocks (SR-6W and SR-7W) for the shift registers 6 and 7 have the same frequency as the clock for the A/D converter 4, and the shift registers 9, 10 and 11 are read out at the clock frequency (SR-9R, SR-10$a$R, SR-10$b$R) of the record signal determined by the time compression ratio K. As seen from the timing diagram of FIG. 3, the shift register 10 in FIG. 2 requires two stages, one being a sum or difference signal write-in shift register 10-$a$ and the other being a readout timing adjusting shift register 10-$b$. It is also necessary to provide two parallel channels with each of the shift registers 6 and 7, and carry out read and write operations alternately in order to prevent the overlap of timing.

In the above embodiment, the L-channel signal, the R-channel signal and the (L+R) or (L−R) signal are recorded in respective horizontal scan periods. Thus, most of dropouts appearing in the magnetic tape recording can be detected and compensated. But, in a rare case, a large dropout which extends over more than one horizontal period may occur. In such a case, it is effective to record the signals of the same channel over a predetermined number of continuous horizontal scan periods, as shown in FIG. 4, depending on an expected scale of dropout. This can be readily implemented by increasing the bit capacities of the shift registers 9 to 11 in FIG. 2.

Figure 5:
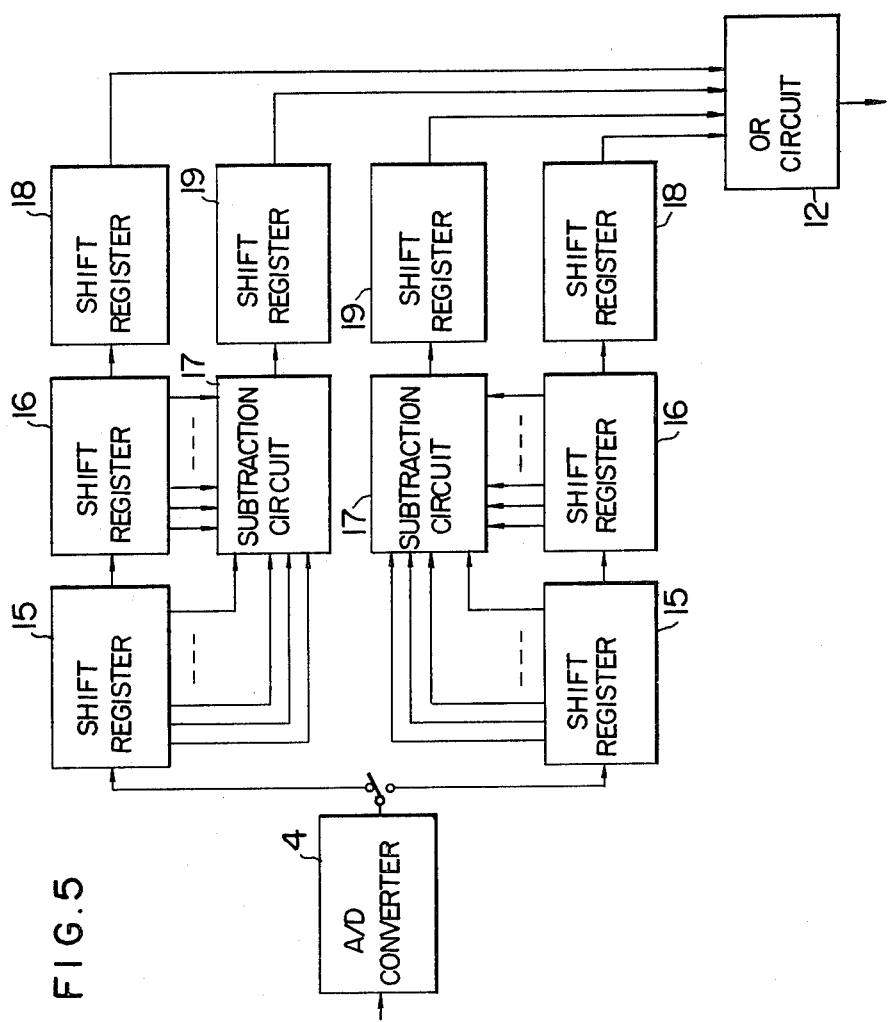
FIG. 5 shows a block diagram for implementing an expanded record pattern of the present invention.

The approaches to the burst error have been discussed so far. It may be possible that errors occur at discrete positions on the magnetic tape so that the left channel and the corresponding right channel are simultaneously lost. This problem may be resolved by recording difference signals between the current samples and the previous samples in the respective channels instead of the sum or difference signal of the left and right channels. This can be implemented by a configuration shown in FIG. 5. Shift registers 15 and 16 each has a bit capacity corresponding to one sample and the outputs thereof are applied to substraction circuits 17 to produce $(L_n-L_{n-1})$ signal and $(R_n-R_{n-1})$ signal, respectively. A number of bits in the output of the shift register 16 corresponding to the number of samples in one horizontal scan period are written into a shift register 18, and the output of the substraction circuit 17 is written into a shift register 19. The outputs of the shift registers 18 and 19 are applied to the OR circuit 12 in timed relation as in the case of FIGS. 2 and 3.

Unlike the case of FIG. 2, however, a time axis difference signal is required for each channel in this embodiment and hence the number of bits increases. In a recording system which does not permit the increase of the number of bits, the time axis difference signal may be converted to a differential PCM (DPCM) so that it is recorded without increasing the number of bits.

It should be understood that not only the time axis difference signal but also the L-R channel difference signal can be simultaneously recorded when the DPCM is utilized.

While the recording system for effectively carrying out the error compensation has been described in the preferred embodiments, the error detection in the playback station can be carried out in the following procedures.

(1) Parity-check the reproduced left and right channels.
(2) Calculate a sum or difference signal based on left and right correctly reproduced samples.
(3) Parity-check the reproduced (L+R) or (L−R) signal.
(4) Check whether a difference between the correctly reproduced (L+R) or (L−R) signal and the sum or difference calculated in (2) above is equal to zero.

If all of the above processes are valid, the reproduced signal is considered correct and it is supplied to the D/A converter. If an error is detected in either the left channel or right channel in the process (1) and the result of the process (3) is correct, the sample in the error channel can be corrected using the sample in the other or correct channel. When errors are detected in both the left and right channels in the process (1), they may be compensated to a certain extent by a known previous value retaining method, but when a higher precision is required, the time axis difference signal described above may be used.

If an error is detected in the process (3) when the time axis difference signal is used, the error can be corrected.

While the sum or difference signal is used in the above embodiments, any other correlation signal of the left and right channels or a specially processed signal may be used in place of the sum or difference signal. Furthermore, the two-channel stereo-signal and the correlation signal thereof may be packed into one horizontal scan period.

According to the present invention, a high precision error correction can be attained with a minimum amount of increase of redundancy, whereas the prior art system has carried out only the error detection.

Accordingly, the present invention not only improves the error detection precision but also provides the error correction capability which assures higher precision than the previous value retaining method used heretofore. Therefore, the present invention can materially improve the performance of the PCM recorder.

I claim:

1. A PCM recording apparatus comprising first means for deriving digitized sterophonic sound signal samples for left and right channels, each of said digitized samples including error detecting bits, second means for deriving a signal indicative of correlation such as sum or difference of the digitized left and right channel signals including the error detecting bits, and third means for recording the signals from said first and second means.

2. A PCM recording apparatus according to claim 1, wherein a left channel sample, a right channel sample and a correlation signal such as a sum or difference signal of the left and right channel samples constitute a separate frame, respectively and each frame is recorded on a predetermined position on a record medium.

3. A PCM recording apparatus according to claim 1, wherein a left channel sample, a right channel sample and a correlation signal such as a sum or difference signal of the left and right channel samples are each packed in a different one of horizontal scan period and recorded on a record medium in a predetermined arrangement.

4. A PCM recording apparatus comprising first means for deriving digitized stereophonic sound signal samples for left and right channels, said digitized samples each including error detecting bits, second means for deriving correlation signals such as sum or difference signals of a current sample and an immediately preceding sample in left and right channels, respectively, together with error detecting bits therefor, and third means for recording the signals from said first and second means.

* * * * *